United States Patent [19]

Maehara

[11] Patent Number: 4,469,954
[45] Date of Patent: Sep. 4, 1984

[54] MOVABLE SUBSTATION

[75] Inventor: Shigeto Maehara, Nishinomiya, Japan

[73] Assignee: Mitsubishi Denki Kabushiki Kaisha, Japan

[21] Appl. No.: 439,207

[22] Filed: Nov. 4, 1982

[30] Foreign Application Priority Data

Nov. 24, 1981 [JP] Japan .......................... 56-174808[U]

[51] Int. Cl.³ .............................................. H02B 5/04
[52] U.S. Cl. ...................................... 290/1 A; 307/68
[58] Field of Search ........................... 290/1 A, 1 R, 2; 307/64, 68, 70

[56] References Cited

U.S. PATENT DOCUMENTS

| | | | |
|---|---|---|---|
| 2,427,678 | 9/1947 | Laging | 307/68 X |
| 4,117,342 | 9/1978 | Melley, Jr. | 290/1 A |
| 4,395,696 | 7/1983 | Menard | 307/64 X |

Primary Examiner—J. V. Truhe
Assistant Examiner—W. E. Duncanson, Jr.
Attorney, Agent, or Firm—Leydig, Voit, Osann, Mayer and Holt, Ltd.

[57] ABSTRACT

This invention relates to a movable substation which comprises: a movable truck frame, substation equipment carried on said frame, a generator having a prime mover coupled therewith for supplying electric power to said substation equipment for the starting thereof, and a relay unit for detecting whether or not said substation equipment has started to supply electric power to a load, said relay unit connecting said generator to said substation equipment when electric power is not supplied from said substation equipment to said load, and disconnecting said generator from said substation equipment when the electric power can be supplied from said substation equipment to the load, and connecting said substation equipment to the load.

2 Claims, 4 Drawing Figures

MOVABLE SUBSTATION

BACKGROUND OF THE INVENTION

This invention relates to a movable substation. A movable substation is generally transported by carrying a high-tension switch gear, a transformer and a low-tension switch gear on a trailer. A conventional substation does not require an assembly work by a civil engineer or any other construction work thereby, resulting in its frequent use as an emergency or temporary substation facility.

A conventional movable substation generally comprises, as shown in FIG. 1, a trailer 1 having a truck frame 2, moving wheels 3 at one end of the frame 2 and supporting legs 4 for fixing stopping position at the other end of the frame 2. On the upper surface of the frame 2 are carried a high-tension switchgear 5, a main transformer 6, a low-tension switchgear 7, and an auxiliary transformer 6A. The switchgear 5 is electrically connected to the transformer 6 via a connector 8. The transformer 6 is electrically connected to the switchgear 7 via a connector 9. The switchgear 7 is electrically connected to the transformer 6A via a connector 10. FIG. 2 shows a power supply for operating and controlling the equipment carried on the trailer. the electric power for operating and controlling the movable substation at a normal operating time is supplied through the transformer 6A, a connector 11, a switch 13 and a connector 12 leading to the substation equipment. However, it is necessary to obtain electric power for operating and controlling the equipment from a power supply other than the movable substation through a switch 15 and an external connector 14 in order to start the respective equipment. Therefore, the conventional substation cannot be started unless it is located near an electric power source.

SUMMARY OF THE INVENTION

This invention has an object to provide a movable substation which can eliminate the above-mentioned drawbacks inherent in the conventional substation by internally incorporating a generator having prime mover coupled therewith for operating and controlling the equipment in the substation.

BRIEF DESCRIPTION OF THE DRAWINGS

In the drawings, the same reference numerals denote the same or equivalent parts and components.

DESCRIPTION OF THE PREFERRED EMBODIMENTS

Figure 3:
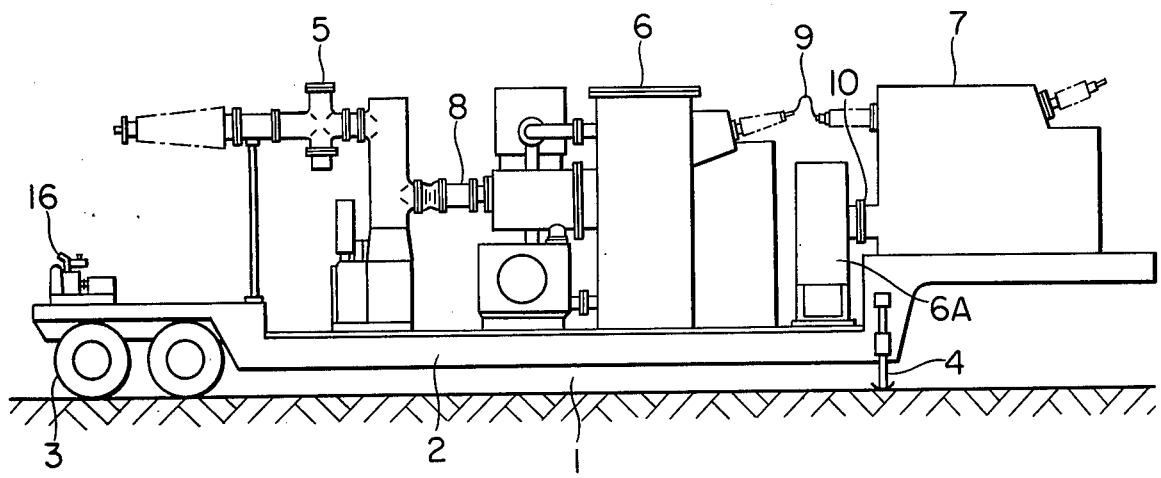
FIG. 3 is a front view showing an embodiment of this invention.

FIG. 3 shows an embodiment of this invention, in which the truck frame 2 of a trailer 1 is supported by wheels 3 and supporting legs 4. On the frame 2 are carried a high-tension switchgear 5, a main transformer 6, a low-tension switch gear 7, an auxiliary transformer 6A, and a generator 16 having a prime mover coupled thereto. The switchgear 5 is electrically connected to the transformer 6 via a connector 8. the transformer 6 is electrically connected to the switchgear 7 via a connector 9. The switchgear 7 is connected to the transformer 6A via a connector 10. A control circuit for the embodiment in FIG. 3 is as shown in FIG. 4.

Figure 1:
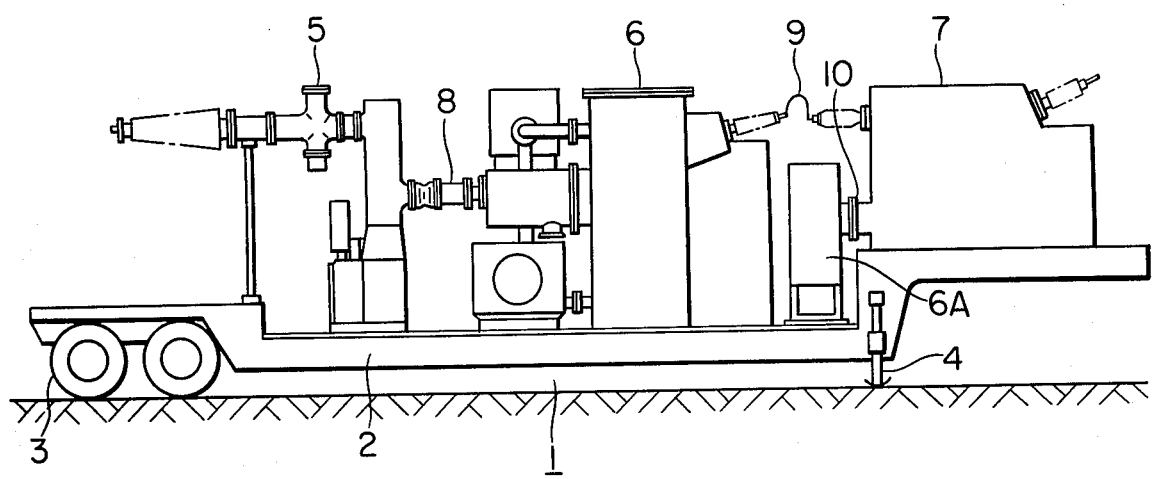
FIG. 1 is a front view showing a conventional movable substation.
Figure 2:
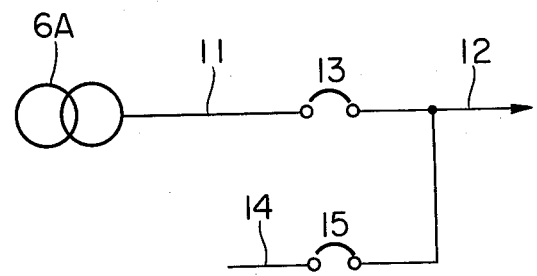
FIG. 2 is a schematic view of the power supply circuit in FIG. 1.
Figure 4:
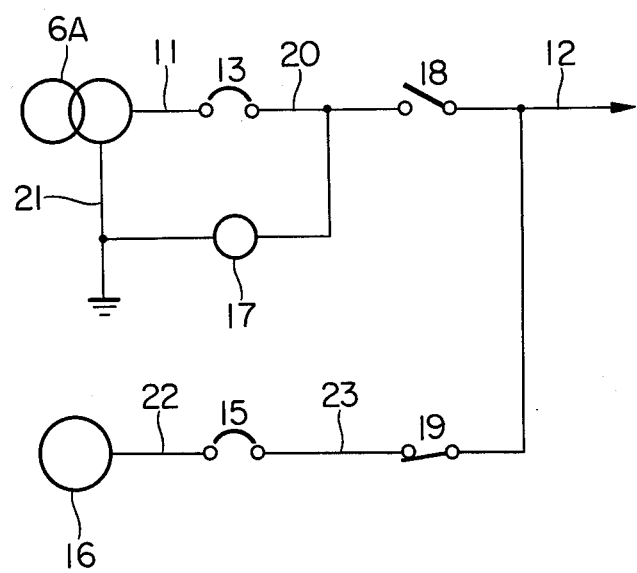
FIG. 4 is a schematic view of the power supply circuit in FIG. 3.

In FIG. 4, the parts and units which correspond to those in FIG. 2 are denoted by the same reference numerals. Reference numeral 17 denotes a relay which senses the fact that the transformer 6A is energized, the switch 13 is closed and a connector 20 is energized, numeral 18 denotes a normally open contact of the relay 17, and numeral 19 denotes a normally closed contact of the relay 17. The relay 17 is connected at its one terminal to the low-tension neutral point connector 21 of the transformer 6A and is connected at its other terminal to a connector 20 which connects the switch 13 to the contact 18. The generator 16 is connected to the connector 12 which leads to the substation equipment through a connector 22, a switch 15, a connector 23 and a normally closed contact 19. In this arrangement, the electric power necessary for operating and controlling substation equipment at the starting time thereof is supplied by the generator 16 having a prime mover coupled thereto. When the transformer 6A is energized, from the main transformer 6A and it is desired to operate the substation equipment with electric power from the auxiliary transformer 6A, the switch 13 is closed, causing the relay 17 to be activated, thereby allowing the normally closed contact 19 to be opened (disconnecting the generator 16) and the normally open contact 18 to be closed, and the electric power is thereafter supplied from the transformer 6A.

According to this invention, this substation can be used in areas where no power supply (normally 100 V to 500 V) for operating and controlling the equipment is available, thereby resulting in the increased usability of the substation.

What is claimed is:

1. A movable substation comprising: a movable truck frame, substation equipment carried on said frame, a generator having a prime mover coupled therewith for supplying electric power to said substation equipment for the starting thereof and a relay unit for detecting whether said substation equipment has started or not and to supply electric power to a load wherein said relay unit connects said generator to said substation equipment when electric power cannot be supplied from said substation equipment to said load, and disconnects said generator from said substation equipment when electric power can be supplied from said substation equipment to said load, and connects said substation equipment to said load.

2. A movable substation as defined in claim 1, wherein said relay unit has a contact which disconnects said generator from said substation equipment when said substation equipment can supply electric power to a load and a contact which connects said substation equipment to said load.

* * * * *